No. 699,712. Patented May 13, 1902.
F. RADEMACHER.
OVEN.
(Application filed Nov. 18, 1901.)
(No Model.) 3 Sheets—Sheet 1.
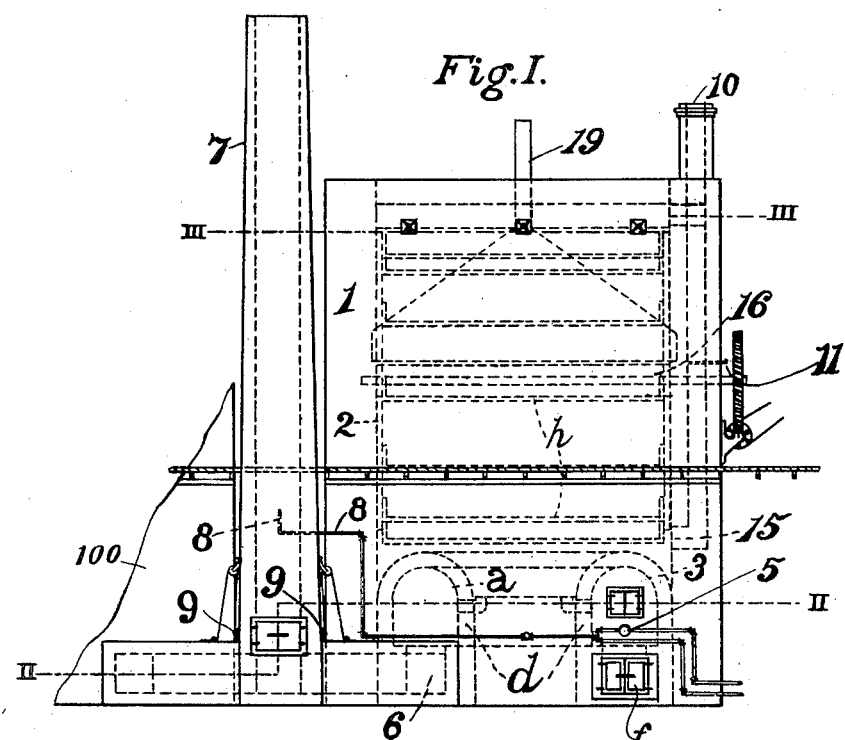
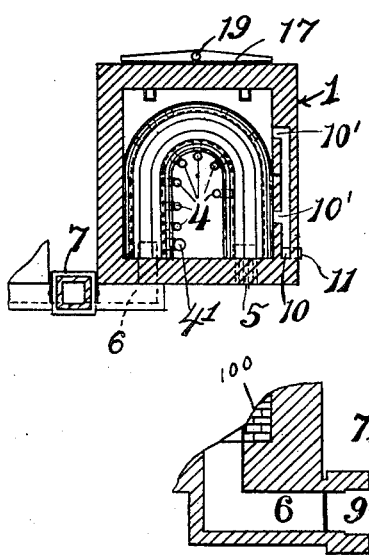
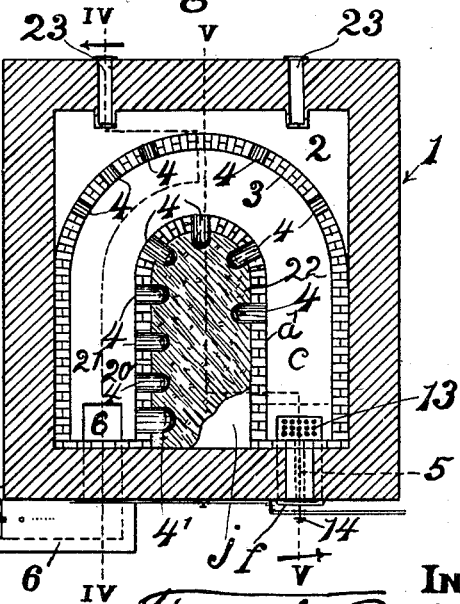
WITNESSES.
C. F. Richey
J. Townsend.
INVENTOR.
Frank Rademacher
by Townsend Bros
his attys.

No. 699,712. Patented May 13, 1902.
F. RADEMACHER.
OVEN.
(Application filed Nov. 18, 1901.)
(No Model.) 3 Sheets—Sheet 2.
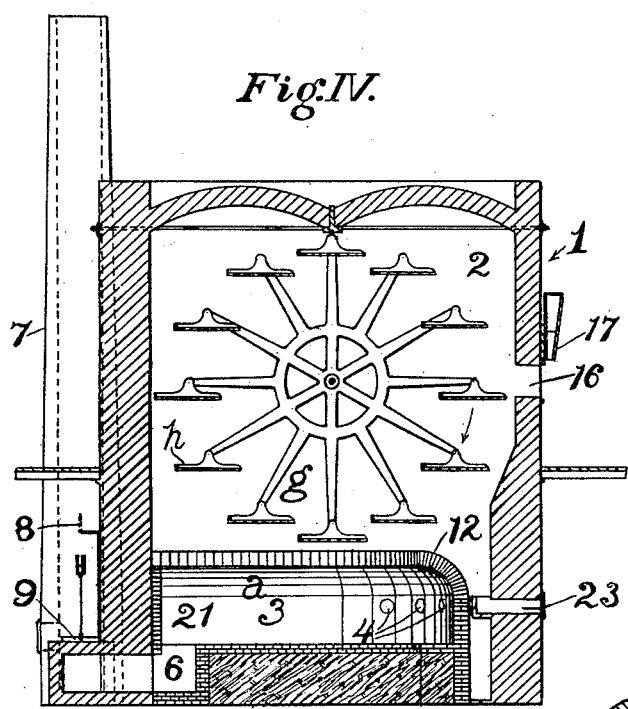
Fig. IV.
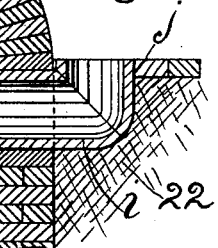
Fig. VI.
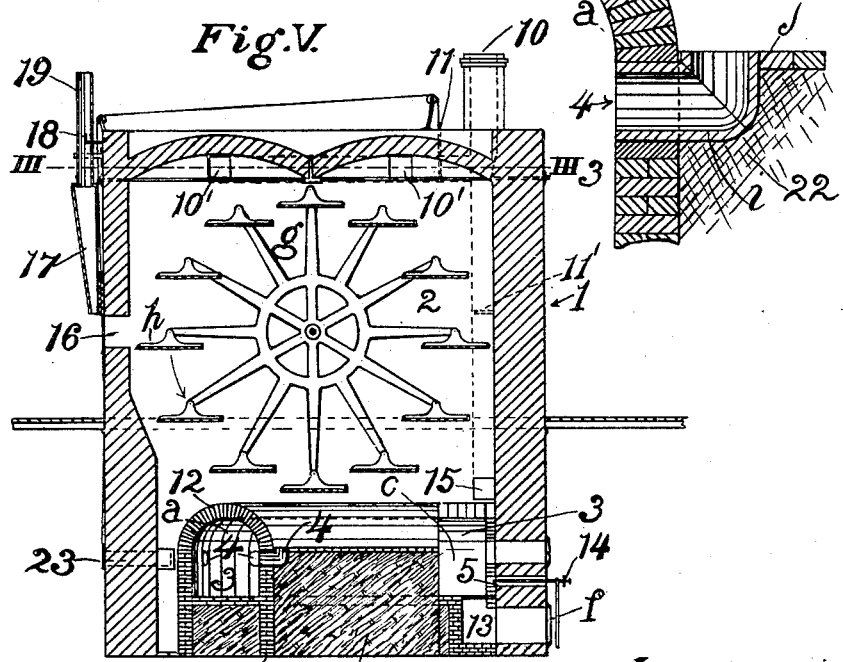
Fig. V.
WITNESSES.
C. F. Richey
J. Townsend.
INVENTOR.
Frank Rademacher
by Townsend Bros.
his attys.
THE NORRIS PETERS CO., PHOTO-LITHO., WASHINGTON, D. C.

No. 699,712. Patented May 13, 1902.
F. RADEMACHER.
OVEN.
(Application filed Nov. 18, 1901.)
(No Model.) 3 Sheets—Sheet 3.
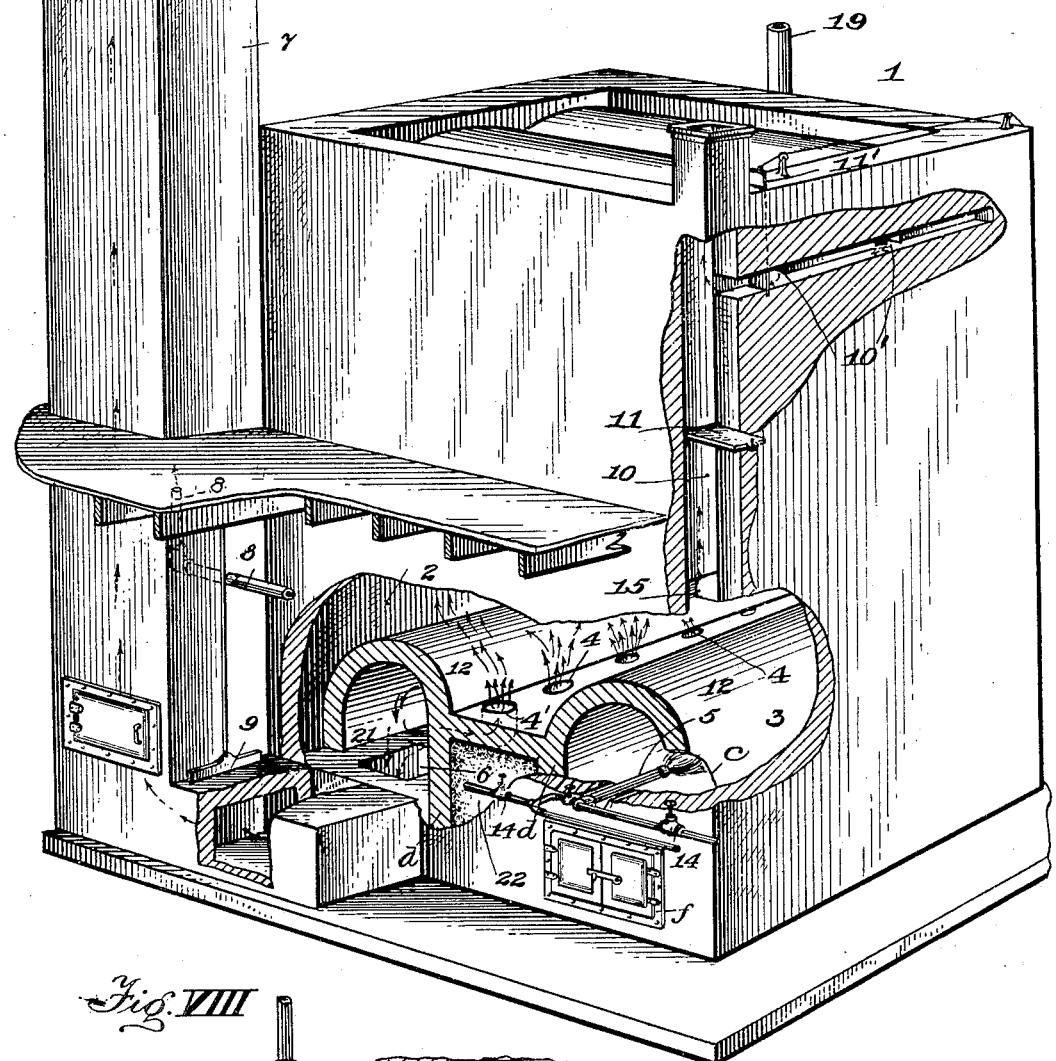
Fig. VII
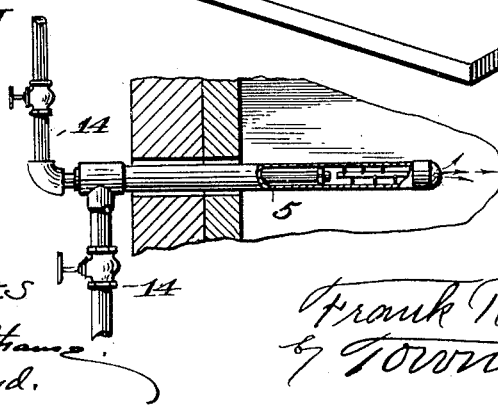
Fig. VIII
WITNESSES
Edmund A. Strauss
W. S. Boyd.
INVENTOR
Frank Rademacher
by Townsend Bro
his atty.

UNITED STATES PATENT OFFICE.

FRANK RADEMACHER, OF LOS ANGELES, CALIFORNIA.

OVEN.

SPECIFICATION forming part of Letters Patent No. 699,712, dated May 13, 1902.

Application filed November 18, 1901. Serial No. 82,777. (No model.)

*To all whom it may concern:*

Be it known that I, FRANK RADEMACHER, a citizen of the United States, residing at Los Angeles, in the county of Los Angeles and State of California, have invented new and useful Improvements in Ovens, of which the following is a specification.

This invention is applicable generally to ovens commonly known as "cracker" bake-ovens.

One object of this invention is to provide means whereby a cracker bake-oven can be heated by the use of fuel-oil and the heat exactly and readily regulated to any degree which may be required for the purposes for which the oven is to be used. Heretofore such ovens have been heated by coke and anthracite coal.

An object of this invention is the economy which results from the use of oil as fuel.

Another object is the avoidance of the obnoxious and injurious gases which arise from the use of coal or coke as fuel.

It is necessary in baking different kinds of cake, crackers, &c., that different degrees of heat shall be used. With some kinds of articles to be baked a high degree of heat is required, which is wholly unsuited for baking other articles; and an object of this invention is to enable the baker to change the heat of his oven quickly from low degree to high degree, and vice versa, and to accurately maintain the heat at any degree required. By means of this invention goods may be baked more uniformly, thus improving the quality and appearance of the same. For instance, small wafers which taper to a thin edge from a thicker center can be cooked to a uiform degree throughout without burning the thin edge.

Another object of this invention is to provide greater comfort for the attendant who puts into the oven the articles to be baked and takes out of the oven the articles which have been baked. This advantage results from the absence of noxious gases and from the withdrawal of the heat from the mouth of the oven.

The accompanying drawings illustrate my invention.

Figure I is an elevation of an oven embodying my invention, the interior construction being indicated in dotted lines. Fig. II is a plan section on irregular line II II, Fig. I. Fig. III is a plan section on line III III, Figs. I and V, omitting the reel. Fig. IV is a vertical section of the oven. Irregular line IV IV, Fig. II, indicates the line of this section through the fire-tunnel and the draft-tunnel leading therefrom. Fig. V is a vertical section on irregular line indicated by V V, Fig. II. Fig. VI is a detail in vertical section showing one of the outlets through the wall of the fire-tunnel into the chamber of the oven. Fig. VII is a broken perspective view of my improved oven. Fig. VIII is an enlarged broken view of one form of burner adapted to be used with my oven.

1 designates an oven having a chamber 2 and a bent fire-tunnel 3, of fire-brick or other refractory material, constructed inside the chamber 2, at the bottom thereof, and furnished with passages 4, opening through the tunnel-walls directly into the chamber of the oven.

5 designates an oil-burner arranged to produce fire from fuel-oil at one end of the bent fire-tunnel 3.

6 designates a draft-flue opening from the bottom of the tunnel 3, at the other end thereof, and discharging through a stack 7.

8 designates a steam-pipe arranged to discharge a jet of steam into the stack 7 to produce a forced draft through the flue 6.

9 designates a damper constituting means for controlling and stopping the draft through the flue 6. It is to be understood that when the oven is in operation the draft through flue 6 is to be cut off, so that approximately all the heat produced in the tunnel passes into the oven.

10 designates a draft-flue leading from the chamber of the oven through the outlets 10'.

11 and 11' designate means, as dampers, for controlling the draft through the flue 10. The fire-tunnel is preferably constructed with an arch 12, and the passages 4 preferably open through the walls of the tunnel just below the spring of the arch, thus leaving a considerable fire-space not subject to draft at the top of the tunnel in which any smoke and gases that rise in the tunnel may be consumed, so that no unconsumed products may pass into the oven-chamber.

13 designates an air-inlet opening into the fire-tunnel below the injector-burner to afford an ample supply of oxygen for combustion and nitrogen for heating the oven.

14 designates the usual means for controlling the burner.

15 designates an additional draft-outlet from the oven, opening from the chamber of the oven, near the bottom thereof, and leading into a suitable stack 10. This outlet is for the purpose of removing the heated air from the bottom of the oven to reduce the temperature of the oven.

16 designates the usual opening to give access to the oven, through which opening the attendant inserts the articles to be baked and withdraws the baked articles.

17 designates the usual ventilating-hood at said opening 16.

18 designates means for producing a forced draft through said hood, thus to take up the heat which issues from said opening and prevent the same from injuring or interfering with the workmen. Such means preferably consists of a steam-jet to act as an ejector through the draft appliance formed of the hood 17 and the pipe 19 leading therefrom.

The heat outlets or passages 4 through the walls of the bent fire-tunnel are principally arranged in the inner wall 20 of that limb 21 of said tunnel which is farthest removed from the burner 5; but some of the passages 4 are arranged elsewhere, all of them being desirably out of the direct blast of the burner, so that the heat and fire are conducted around within the fire-tunnel and along beneath the arch without any direct draft from the burner through any of the passages, and the heated air is emitted through said passages 4 by the pressure produced by expansion of air in the tunnel from the operation of the burner. The tunnel is preferably made substantially U-shaped, with the floor $j$ between the two limbs. The air-inlet 13 is furnished with a door or damper $f$ to control the inflow of air below the burner.

22 designates a reinforcing bank or body which may be constructed of earth or other suitable material within the space between the two limbs $c$ and 21 of the fire-tunnel. This body gives support to the inner wall $d$ of the tunnel. The outer walls of the limbs $c$ and 21 of the tunnel are preferably supported by the walls of the oven 1. The arch 12 of the tunnel is not insulated from the oven, so that heat may radiate from said arch into the oven in addition to the heat which is emitted thereinto directly through the passages 4.

In practical operation when it is desired to heat the oven the draft-flue 6 will first be opened and the oil-burner 5 put into operation to supply fire to the fire-tunnel. The means 8 for forcing the draft will also preferably be put into operation, thus producing a draft through the fire-tunnel and the flue 6 until the fire-tunnel is brought to a required temperature and the combustion therein is practically complete. Then the damper 9 and the draft-forcing device 8 will be closed, and thereupon the heat will be caused to pass from the fire-tunnel through the passages 4 directly into the oven-chamber. The damper 11 will be closed, except when the heat at the top of the oven becomes too great, when it may be opened to allow a portion of the heat to escape, thereby reducing the temperature. By regulating the burner 5 and the appropriate dampers the oven can be brought to the required temperature. Any of the products of combustion that may find their way into the oven-chamber before or after the draft through the stack 7 has been cut off will escape through the opening 16, which is open at all times for the passage of material into or out of the oven. When it is desired to lower the temperature, the burner may be turned down or shut off, the damper 9 opened, and the steam-jet at 8 turned on, thus drawing the atmospheric air through the oven and fire-tunnel and out through the stack 7. In this manner the temperature of the oven may be rapidly lowered to the required degree.

$g$ designates the usual oven-reel furnished with pans $h$, on which the articles to be baked are to be moved through the oven from the opening 16 down toward the fire-tunnel and then up from said tunnel and over to the opening 16.

Preferably the passages 4 are circular in cross-section and are lined with refractory tiles or pipes $i$. The passages 4, which open through the inner wall $d$ of the fire-tunnel, are preferably bent upward in a curve through the wall-supporting bank 22, as clearly shown in Fig. VI, and open upwardly through the floor $j$ of the oven.

The fire-tunnel is constructed to discharge its heated contents into the oven-chamber with increasing facility as the distance from the burner increases, thus to compensate for the reduced heat and pressure resulting from the discharge of the heated air through the passages 4, and thus to equalize the admission of heat throughout the oven-chamber—that is to say, the arrangement of the passages 4 is designed to distribute the heat the most effectively inside the oven-chamber.

23 designates two valved air-inlets through which atmospheric air may be admitted in the operation of cooling the oven.

Preferably the passage 4', which is farthest from the oil-burner 5, is of considerably greater capacity than any of the other passages 4, thus to allow the heated air to issue more freely from the end of the fire-tunnel, thereby to compensate for the decreased pressure at that end of the tunnel.

In practice a plurality of ovens may be connected with one stack. This is indicated in Fig. 1 by the fragment of an oven designated by the character 100.

What I claim, and desire to secure by Letters Patent of the United States, is—

1. An oven having a bent refractory fire-tunnel inside the oven-chamber furnished with passages opening directly from the tunnel into the oven; a burner for producing fire at one end of the tunnel, an air-inlet being provided below said burner; means for controlling the burner; a chimney; a flue opening from the fire-tunnel at the end opposite the burner and leading to the chimney; means for controlling the passage through said flue; and means for forcing a draft through said chimney; said oven being provided with draft-openings; whereby the oven can be alternately heated and cooled.

2. An oven provided with a perforated tunnel, means for supplying heat to the tunnel, and means communicating with the tunnel for drawing air therethrough to cool the same.

3. A ventilated oven provided with a perforated tunnel, an oil-burner at one end of the tunnel, and means communicating with the other end of the tunnel for drawing air therethrough to ventilate the same.

In testimony whereof I have signed my name to this specification, in the presence of two subscribing witnesses, at Los Angeles, California, this 5th day of November, 1901.

FRANK RADEMACHER.

Witnesses:
P. R. HAZELTINE,
JOS. F. MAIER, Jr.